United States Patent [19]
Baldomero et al.

[11] Patent Number: 6,142,497
[45] Date of Patent: Nov. 7, 2000

[54] TEMPERATURE HEAT SINK FOR DAMPING CARTRIDGE

[76] Inventors: Ricardo R. Baldomero, 10715 Vera Ave., Felton, Calif. 95018; Peter G. Turner, 3885 Alpine Dr., Evergreen, Colo. 80439

[21] Appl. No.: 09/013,626

[22] Filed: Jan. 26, 1998

Related U.S. Application Data

[60] Provisional application No. 60/058,282, Sep. 9, 1997.

[51] Int. Cl.[7] .................................................. B62K 21/02
[52] U.S. Cl. ........................... 280/276; 280/279; 165/183
[58] Field of Search ......................... 188/264 A, 322.19; 165/183, 181, 179; 280/276, 277, 275, 283, 284, 285, 286, 279

[56] References Cited

U.S. PATENT DOCUMENTS

| | | | |
|---|---|---|---|
| 3,002,729 | 10/1961 | Welsh | 165/183 |
| 5,060,716 | 10/1991 | Heine | 165/183 |
| 5,183,137 | 2/1993 | Siwek et al. | 188/381 |
| 5,409,675 | 4/1995 | Narayanan | 165/183 |
| 5,829,773 | 11/1998 | Rajaee | 280/276 |

*Primary Examiner*—Brian L. Johnson
*Assistant Examiner*—Avraham H. Lerner
*Attorney, Agent, or Firm*—David W. Hansen

[57] ABSTRACT

A heat dissipating arrangement for a damping system, such as the damping system of a bicycle suspension fork. The heat dissipating arrangement includes a heat sink, which, in a preferred embodiment, has a substantially cylindrical body and radially extending heat sink fins. The heat sink is either positioned over or around a damping cartridge or other damping system containing damping fluid or is formed as the damping cartridge itself. Preferably, the heat sink is positioned within the inner fork tube of a suspension fork with the heat sink fins in close proximity, and preferably contacting, the inner wall of the inner fork tube. Thus, the heat sink fins dissipate heat from the damping system to the inner fork tube. The pumping action of the suspension fork, as well as air passing over the fork as the bicycle is moving, dissipate heat from the fins, and thus from the heat dissipating arrangement and the damping system.

12 Claims, 3 Drawing Sheets

TEMPERATURE HEAT SINK FOR DAMPING CARTRIDGE

CROSS-REFERENCE TO RELATED APPLICATION

The present application claims the benefit of the earlier filing date of copending U.S. Provisional Patent Application Ser. No. 60/058,282, filed Sep. 9, 1997.

BACKGROUND OF THE INVENTION

The present invention relates to a heat dissipation system for use in a suspension system. More particularly, the present invention relates to a heat sink and heat dissipation arrangement that cools the damping fluid of a suspension system, thereby improving the performance, as well as the life, of the damping components.

In the past, suspension systems in general have been used for many applications, including cushioning impacts, vibrations or other disturbances experienced by vehicles and machinery. Typical applications, for example, include the use of suspension systems in bicycles and motorcycles.

For example, bicycles have been developed with suspension systems for cushioning impacts or vibrations experienced by the rider when the bicycle contacts bumps, ruts, rocks, pot holes or other obstacles and road variations. Typically, such bicycle suspension systems have been configured for use in the front or rear bicycle fork, in the head tube that connects the front fork to the bicycle frame and handlebars, in the seat post, and in conjunction with a rear wheel swing-arm assembly, among other locations.

Typically, a suspension system is provided in the form of two slidable tubular elements with a spring element or system provided therein. The spring system biases the tubular elements into a spaced apart condition when the suspension system is under neutral (i.e., no external load) conditions. The tubular elements are positioned to slidably move with respect to each other upon impact to the frame, with the spring system therein resisting the compression forces. Depending on the type of spring used, the spring system stores some, if not all, of the energy imparted to the system during compression and releases the energy to return the tubular elements to their neutral position.

Bicycles incorporating suspension systems have become increasingly common. One popular form of a bicycle suspension system is a suspension fork having at least one, and usually a pair, of upper tubular fork elements slidable with respect to a pair of lower tubular fork elements, both pairs straddling the front wheel of the bicycle. Because the upper fork elements are preferably telescopically slidable with respect to the lower fork elements, the upper or lower elements may be considered inner fork elements, and the other two elements may be considered outer fork elements within which the inner fork elements slide. Typically, the upper pair of tubular elements are the inner fork elements and the lower pair are the outer fork elements. However, the reverse arrangement may also be used.

In order to enhance the performance of suspension systems further, damping systems have been provided to dampen the motion of the suspension system. Such damping systems may be formed within the tubular elements of the suspension system as in U.S. Pat. No. 5,445,401 to Bradbury and U.S. Pat. No. 4,561,669 to Simons which patents are expressly incorporated herein by reference in their entirety. More preferably, the damping system may be provided in a self-contained damping cartridge, as described in U.S. Pat. No. 5,456,480 to Turner et al., which is expressly incorporated herein by reference in its entirety. Such damping cartridges provide a number of benefits. For example, damping cartridges typically reduce overall weight (because less damping fluid or gas is needed), permit simplified interchangeability and replacement of the damping components, and generally reduce the amount of leakage that may occur from the damping system.

The amount of energy absorbed by the suspension system and its damping system depends on the path or terrain over which the bicycle or motorcycle is ridden, as well as the bicycle/motorcycle speed, rider weight, frame type, wheel thickness and other factors. Frequently, a great amount of heat may be generated by the damping system, adversely affecting the damping characteristics of the system and increasing the internal pressure of the cartridge as the damping fluid expands, thus detrimentally affecting the structure of the seals and other components of the damping system as well. In particular, damping cartridge failures are often associated with severe riding conditions, such as those that occur during downhill racing. Therefore, dissipation of the heat generated by a damping system is important for the proper functioning of the damping system, and reduces the likelihood of cartridge failures.

SUMMARY OF THE INVENTION

It is therefore an object of the present invention to provide a heat dissipation arrangement and system that dissipates the amount of heat generated in a suspension system, such as a suspension system having a damping system.

It is a related object of the present invention to provide a heat sink for use in a bicycle suspension system, particularly a suspension fork, that dissipates heat generated by the suspension system and particularly the damping system.

It is a further related object of the present invention to provide a damping cartridge having a heat sink that dissipates heat from the damping cartridge generated during the functioning of the suspension system in which the damping cartridge is provided.

These and other objects of the present invention are accomplished in accordance with the principles of the present invention by providing a heat dissipating arrangement for dissipating heat generated by a damping system. The heat dissipating arrangement includes a heat sink that dissipates heat from the damping system such as by pulling heat away from the damping system and into a suspension system element that is externally air cooled. The heat dissipating arrangement is particularly suited for use in bicycle suspension forks with damping cartridges utilizing damping fluid. The heat sink preferably is formed on the damping cartridge wall and transfers it heat from the damping fluid to the fork tubes which are externally air cooled. Additionally, the arrangement provides further cooling by the natural pumping action of the fork tubes which forces air over the internally positioned heat sink, thereby further dissipating heat. The heat dissipating arrangement of the present invention thus reduces the number of cartridge and other damping system failures caused by overheating.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

Figure 1:
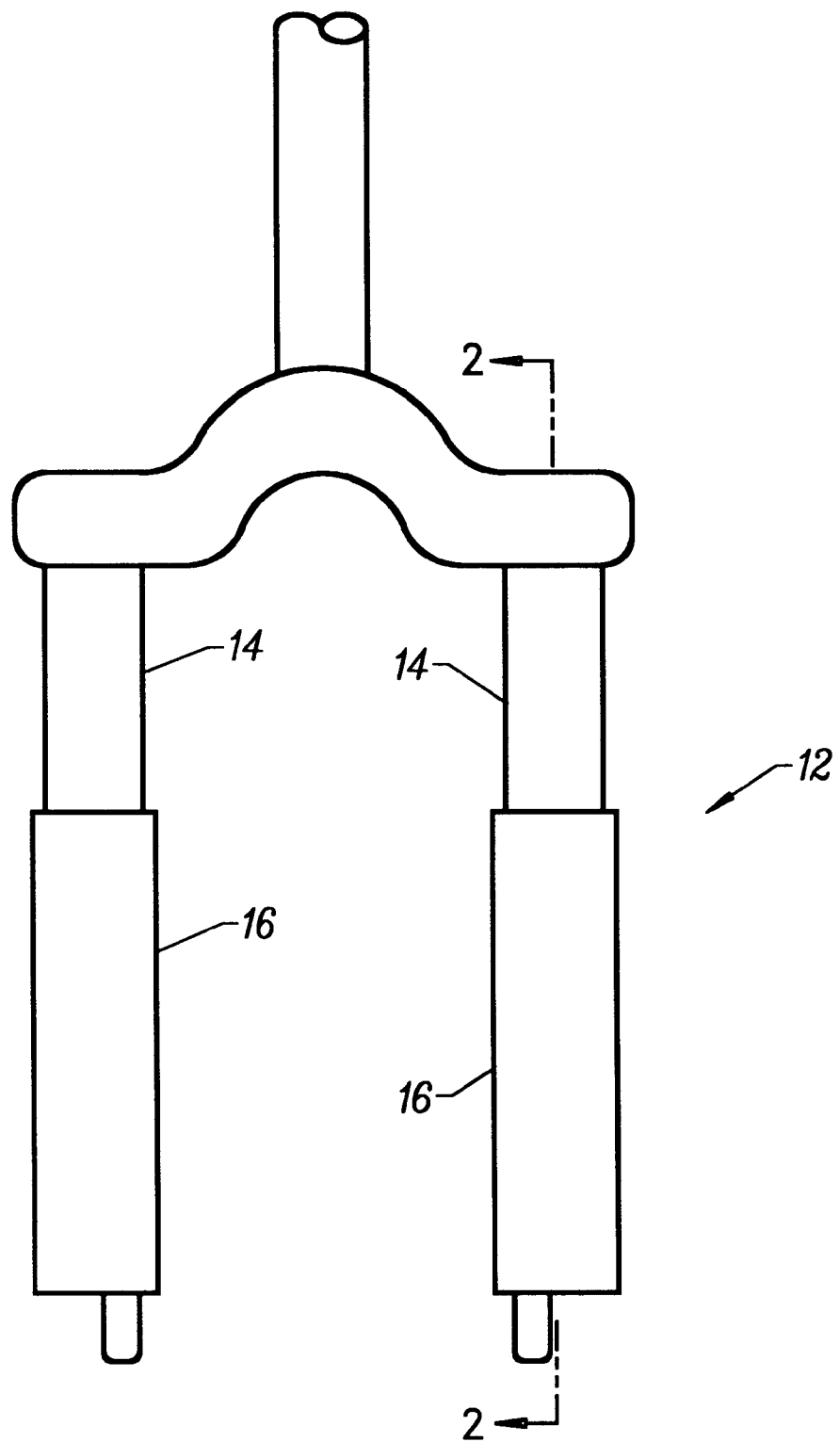
FIG. 1 is a perspective view of an exemplary suspension fork to which the heat dissipating arrangement of the present invention may be applied.
Figure 2:
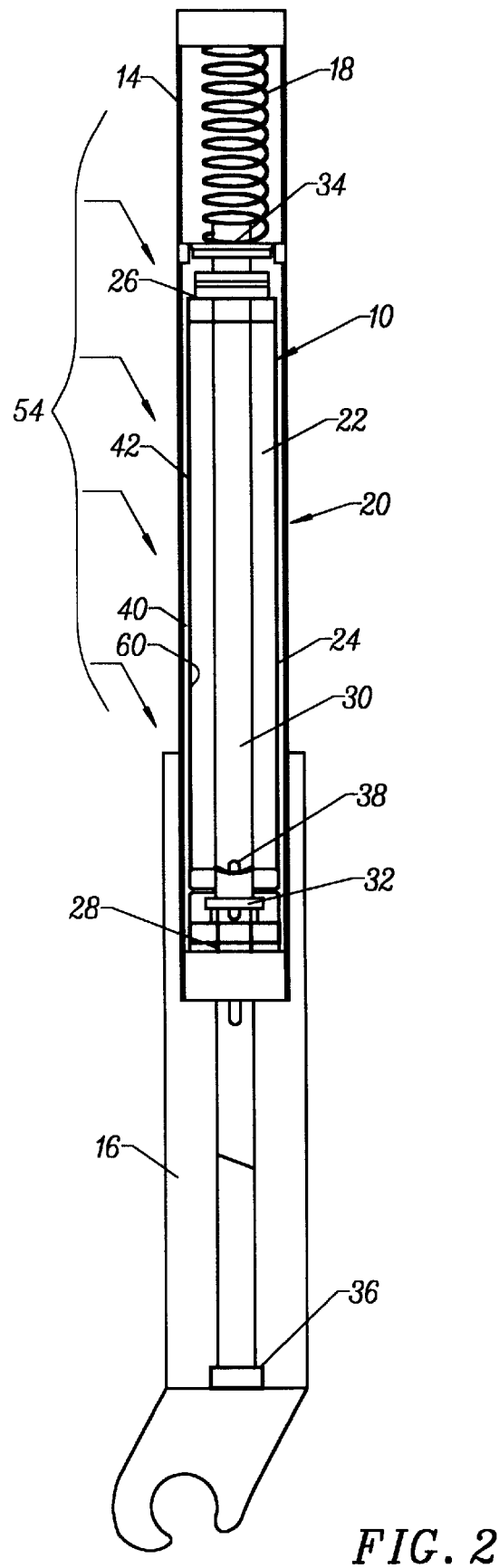
FIG. 2 is a cross-sectional view along line II—II of FIG. 1, showing the heat dissipating arrangement of lit the present invention.

The heat dissipating arrangement 10 of the present invention is disclosed herein as applied in a suspension fork 12 of a bicycle, as shown in FIGS. 1 and 2. However, it will be understood that the principles of the present invention may be applied to other suspension systems having movable elements that generate an undesirable amount of heat during use.

The suspension fork 12 of FIG. 1 includes an upper pair of tubular elements or fork tubes 14 and a lower pair of tubular elements or fork tubes 16. Although the upper fork tubes 14 are shown as inner tubes slidable within the lower fork tubes 16 (outer tubes), it will be appreciated that the lower tubes 16 may, instead, be the inner tubes slidable within outer, upper outer tubes 14. A spring assembly 18 (FIG. 2) is positioned within the upper and lower tubes 14, 16 to bias fork tubes 14, 16 apart, to absorb compression forces applied to suspension fork 12, and to provide rebound forces that return the fork tubes 14, 16 to their neutral position spaced apart from one another.

A damping system 20 is also provided in suspension fork 12 of FIG. 1 (as can be seen in the cross-sectional view of FIG. 2) to enhance the suspension system performance. Preferably, damping system 20 is provided in inner fork tube 14, which, in the embodiment of FIGS. 1 and 2, is the upper tube. However, damping system 20 may, instead, be provided in the outer tube 16. Although damping system 20 may include damping fluid which can be a liquid or a gas 22, the preferred embodiment of the present invention includes a hydraulic oil as the damping fluid. Although damping fluid 22 may be placed directly within at least one of the fork tubes 14, 16 (which is then sealed to retain the damping fluid therein), preferably a damping cartridge 24 is provided to hold damping fluid 22 within inner tube 14. Still more preferably, such a damping cartridge can be configured as a self-contained unit for easy replacement and servicing.

Such a damping cartridge is illustrated in FIG. 2, in which damping cartridge 24 preferably is sealed at both ends 26, 28 to retain fluid 22 therein. Damping system 20 also includes a piston rod 30 carrying a piston 32 substantially midway between piston rod ends 34, 36. The piston rod 30 extends between the two telescopically slidable fork tubes 14, 16 and lower end 36 is coupled to outer tube 16 such that relative movement of tubes 14, 16 causes corresponding movement of piston rod 30 to permit damping with the assistance of piston 32 coupled thereto. Piston rod 30 and/or piston 32 has at least one passageway 38 through which damping fluid 22 may pass as piston 32 moves through cartridge 24. Typically, passageways 38 are adjustable by means of a needle valve or other valve mechanism to vary the flow rate of damping fluid 22 and the damping effect of the damping system 20.

Figure 3:
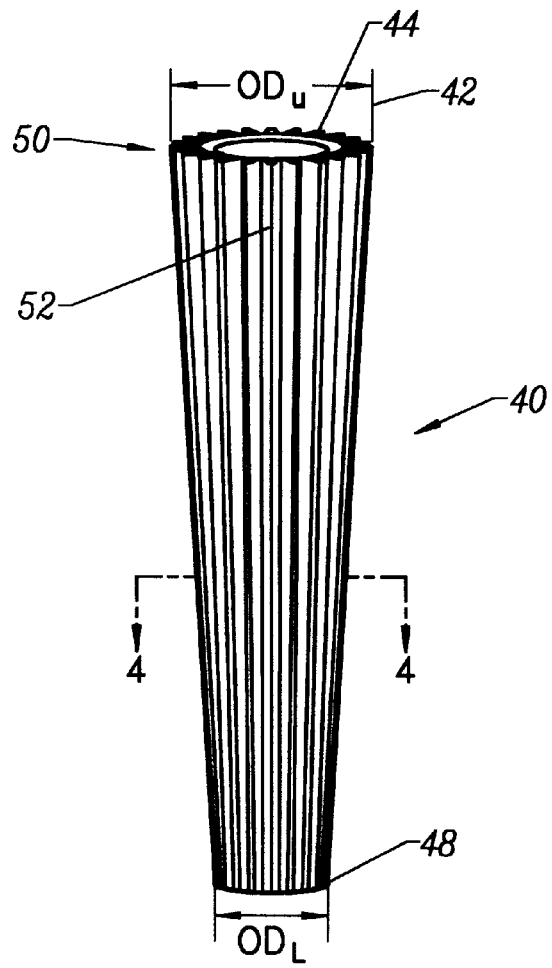
FIG. 3 is an isolated perspective view of a heat sink formed in accordance with the principles of the present invention for use with the heat dissipating arrangement of the present invention.
Figure 4:
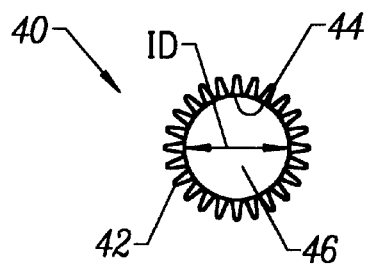
FIG. 4 is a cross-sectional view along line IV—IV of the heat sink of FIG. 3.

Heat dissipating arrangement 10 of the preferred embodiment of the present invention is designed for use in a cartridge-type system, using cartridge 24 containing damping fluid 22. In accordance with the principles of the present invention, heat dissipating arrangement 10 includes a heat sink 40 having radially extending heat sink fins 42, as shown in FIGS. 3 and 4. As in the embodiment shown in FIG. 3, fins 42 may be integrally formed on the exterior surface of the cartridge body 24. The heat sink 40 is essentially tubular, having a substantially cylindrical body 44 with a longitudinal axis 46, and preferably forms the wall of the cartridge 24 in which the damping fluid 22, piston rod 30, piston 32, and other damping elements of damping system 20 are housed. Alternatively, heat sink 40 may be formed as a separate heat sink structure positioned over or in proximity to the exterior of the cartridge body 24. Preferably, at least the exterior of upper end 50 of heat sink 40 is provided with threading 52 by which heat sink 40 may be threadedly coupled to inner fork tube 14. Additionally, upper end 50 may be shaped, such as hexagonally, to facilitate grasping by a tool to remove heat sink 40 from inner tube 14.

The length of heat sink 40 is selected based on the length of the damping system 20 and fork tube with which heat sink 40 is to be used. Where the tube in which heat sink 40 is positioned is tapered (as are most inner tubes, in order to reduce weight, and as is true for inner fork tube 14 of FIG. 1), the outer diameter of heat sink 40 is also tapered towards the bottom 48, as shown in FIG. 3, to conform to the taper of inner tube 14 in which heat sink 40 is placed. Exemplary tapering is from an upper outer diameter $OD_u$ of approximately 1.2 inches (3.05 cm) to about a reduced lower outer diameter $OD_L$ of approximately 1 inch (2.54 cm). Preferably, such tapering is accomplished by reducing the radial extent of heat sink fins 42. Because damping piston 32 is to slide along the interior of heat sink 40, if heat sink 40 forms the cartridge body 24 containing damping fluid 22 the inner diameter ID (FIG. 4) of heat sink 40 preferably remains constant, as selected for housing damping piston 32 to be inserted within heat sink 40.

The radially extending heat sink fins 42 preferably extend along the entire length of the cylindrical body 44 of heat sink 40, substantially along the longitudinal axis 46. The longitudinal length, radial extent, thickness, and spacing of fins 42 are selected to provide optimal heat dissipation from suspension system in which heat sink 40 is to be used. For instance, approximately twenty five (25) fins 42 may be provided, spaced about 15° apart, each fin 42 being approximately 0.05 inches (0.127 cm) thick and having a height or radial extent of approximately 0.34 inches (0.864 cm) from the exterior surface of the heat sink wall. It will be understood, however, that these dimensions may be varied to provide the desired heat dissipation for the damping system, suspension system, and fork (inner tubes in particular) with which heat sink 40 is to be used.

Preferably, the heat sink fins 42 (and typically the entire heat sink 40) are formed from a highly conductive material, such as aluminum, steel, or the like. Where weight is an issue, however, such as for bicycles intended for racing applications, use of as lightweight a material as possible is preferred. The heat sink 40 of the preferred embodiment is therefore made from aluminum. The finish of the heat sink is modified as desired to permit optimum efficiency of the damping system 20 within the heat sink 40.

The heat sink fins 42 transfer heat generated within damping system 20 outwardly from the damping system 20 to the external environment. Accordingly, the heat sink fins 42 are in close proximity to the inner surface 60 of fork tube in which heat sink 40 is placed to transfer heat from the damping fluid 22 within the damping cartridge 24 to inner fork tube 14. Preferably, the entire outer ends of heat sink fins 42 contact the inner surface of the fork tube in which the damping cartridge 24 is positioned.

Because the fork tubes 14, 16 are exposed to the external environment, these elements of the suspension system are externally air cooled. Thus, efficient, low cost cooling of damping system 20 is provided by the heat sink 40 of the present invention. In particular, the greatest amount of damping energy is typically created by the damping system when the bicycle is moving at high speeds over rough terrain. Heat generated from damping is drawn from the damping fluid 22 by heat sink fins 42 into the inner fork tube 14 (which is in close contact with heat sink fins 42). Some of the heat is then conducted to adjoining parts of the bicycle. The high speed of the bicycle has the concurrent effect of having outside air 54 pass quickly thereover, as indicated in FIG. 2. The air moving over the bicycle frame, particularly the suspension fork tube containing the heat generating damping system 20, draws heat away from the bicycle. Heat is thus quickly and efficiently drawn by heat dissipating arrangement 10 from damping system 20 out into the ambient, quickly moving air. Additionally, the pumping action inside the fork 12 will force air (and/or another coolant medium, such as oil, that may be placed in the fork) between the fins 42 and over the inner surface 60 of the inner tube 14, helping to distribute the heat over the entire fork 12. The system's thermal mass over which heat may be dissipated is thereby increased, further facilitating heat dissipation. Thus, convection and additional conduction of heat is facilitated by the motion of the bicycle as well as the pumping action of the suspension fork 12 to further increase heat dissipation by the heat dissipation arrangement of the present invention 10.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A heat dissipating arrangement mounted to a damping system of a bicycle suspension fork having telescoping inner and outer fork tubes, said heat dissipating arrangement comprising:

a heat sink having a substantially cylindrical body, said cylindrical body having an outer diameter tapering from a first end of said body to a second end of said body, said heat sink being coaxially positioned about the damping system within said inner fork to dissipate heat; and a plurality of heat sink fins extending radially from said cylindrical body.

2. A heat dissipating arrangement as in claim 1, wherein said damping system is a substantially cylindrical damping system cartridge.

3. A heat dissipating arrangement as in claim 1, wherein said heat sink contains a damping fluid of the damping system.

4. A heat dissipating arrangement as in claim 3, wherein said body of said heat sink has a constant inner diameter selected to accommodate a damping system piston for slidable movement therein.

5. A heat dissipating arrangement mounted to a damping system of a bicycle suspension fork having telescoping inner and outer fork tubes, said heat dissipating arrangement comprising:

a heat sink having a substantially cylindrical body, said heat sink being coaxially positioned about the damping system within said inner fork to dissipate heat, said heat sink being externally threaded for threadedly engaging a threaded inner end of said inner fork tube; and a plurality of heat sink fins extending radially from said cylindrical body.

6. A heat dissipating arrangement as in claim 5, wherein said damping system is a substantially cylindrical damping system cartridge.

7. A heat dissipating arrangement as in claim 5, wherein said heat sink contains a damping fluid of the damping system.

8. A heat dissipating arrangement as in claim 7, wherein said body of said heat sink has a constant inner diameter selected to accommodate a damping system piston for slidable movement therein.

9. A heat dissipating arrangement mounted to a damping system of a bicycle suspension fork having telescoping inner and outer fork tubes, said heat dissipating arrangement comprising:

a heat sink having a substantially cylindrical body, said heat sink being coaxially positioned about the damping system within said inner fork to dissipate heat, wherein an upper end of said heat sink is shaped to facilitate grasping by a tool for removing said heat sink from within said fork tube; and a plurality of heat sink fins extending radially from said cylindrical body.

10. A heat dissipating arrangement as in claim 9, wherein said damping system is a substantially cylindrical damping system cartridge.

11. A heat dissipating arrangement as in claim 9, wherein said heat sink contains a damping fluid of the damping system.

12. A heat dissipating arrangement as in claim 11, wherein said body of said heat sink has a constant inner diameter selected to accommodate a damping system piston for slidable movement therein.

* * * * *